US012247526B2

(12) United States Patent
Sattler et al.

(10) Patent No.: US 12,247,526 B2
(45) Date of Patent: Mar. 11, 2025

(54) SYSTEMS AND METHODS FOR RESETTING A PRESSURE RELIEF VALVE OF A COMMON RAIL FUEL SYSTEM

(71) Applicant: Caterpillar Inc., Peoria, IL (US)

(72) Inventors: Michael E. Sattler, Eureka, IL (US); Daniel R. Puckett, Peoria, IL (US); Bradley S. Bashore, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/333,453

(22) Filed: Jun. 12, 2023

(65) Prior Publication Data

US 2024/0410326 A1 Dec. 12, 2024

(51) Int. Cl.

| | |
|---|---|
| ***F02D 41/38*** | (2006.01) |
| ***F02M 55/02*** | (2006.01) |
| ***F02M 59/44*** | (2006.01) |
| ***F02M 59/46*** | (2006.01) |

(52) U.S. Cl.

CPC ....... *F02D 41/3863* (2013.01); *F02M 55/025* (2013.01); *F02M 59/447* (2013.01); *F02M 59/46* (2013.01); *F02D 2200/0602* (2013.01)

(58) Field of Classification Search

USPC .................................................. 123/447, 456

See application file for complete search history.

(56) References Cited

U.S. PATENT DOCUMENTS

| | | | | |
|---|---|---|---|---|
| 8,371,157 | B2 | 2/2013 | Bowling et al. | |
| 9,347,409 | B2 | 5/2016 | Dölker | |
| 9,458,786 | B2 | 10/2016 | Dölker | |
| 9,599,086 | B2 * | 3/2017 | Smith | F02M 69/52 |
| 10,473,050 | B2 | 11/2019 | Anetsberger et al. | |
| 10,787,987 | B2 | 9/2020 | Dölker | |
| 2021/0372343 | A1 | 12/2021 | Dölker | |
| 2022/0099045 | A1 * | 3/2022 | Wirkowski | F02D 41/3836 |

* cited by examiner

*Primary Examiner* — George C Jin
*Assistant Examiner* — Teuta B Holbrook

(57) ABSTRACT

According to one aspect of the present disclosure, a method of controlling a common rail fuel system of an engine system is provided. The common rail fuel system includes a fuel pump, a fuel rail, a plurality of fuel injectors, and a pressure-responsive relief valve fluidly coupled to the fuel rail. The method comprises identifying a pressure condition of the fuel rail indicative of the pressure-responsive relief valve being in an open and latched condition, the identification being based on detecting a rise and reduction in rail pressure within a threshold time period. The method further comprises terminating flow from the fuel pump, while the common rail fuel system is operating, to unlatch and close the pressure-responsive relief valve.

20 Claims, 4 Drawing Sheets

SYSTEMS AND METHODS FOR RESETTING A PRESSURE RELIEF VALVE OF A COMMON RAIL FUEL SYSTEM

TECHNICAL FIELD

The present disclosure relates generally to common rail fuel systems, and more particularly, to systems and methods for resetting a pressure relief valve of a common rail fuel system.

BACKGROUND

Common rail fuel systems for internal combustion engines may have a high pressure fuel pump that provides fuel at specified pressures to the fuel rail. The fuel system may also include a pressure relief valve for relieving undesired high pressure in the common rail. These pressure relief valves may have a high pressure triggering point that latches the valve open, and a low pressure reset point that unlatches the valve to a closed position. The high pressure triggering point corresponds to a pressure above any normal operation pressures of the common rail. In some instances after the triggering of a pressure relief valve, the fuel pump may continue to pressurize fuel to the common rail to maintain rail pressure above the low pressure reset point required to unlatch and close the pressure relief valve. Thus, the pressure relief valve may remain open and the fuel system may attempt to compensate for the open valve. This can happen, for example, when the fuel system control and monitoring system misdiagnoses the system condition as experiencing a low pressure event, rather than a high pressure event, due to an unrecognized latching open of the pressure relief valve. Such an incorrect diagnosis of the rail condition may thus cause detrimental and prolonged opening of the pressure relief valve, operating the engine at a lower rail pressure than necessary, and/or fuel pump inefficiencies.

U.S. Pat. No. 9,347,409 ("the '409 patent"), describes a method for controlling and regulating an internal combustion engine having a common rail fuel system including a passive pressure relief valve for discharging fuel out of a rail into a fuel tank. The '409 patent describes that, in a first stage of operation, the passive pressure relief valve is set as open when the rail pressure, proceeding from a steady-state rail pressure, exceeds a first threshold value. Subsequently, the pressure may fall below a second threshold value and the relief valve may close. The first threshold value characterizes a higher pressure level than the steady-state rail pressure and the second threshold value characterizes a lower pressure level than the first threshold value. During the time between exceeding the first threshold value and lowering below the second threshold value, the opened pressure relief valve is monitored. However, the '409 patent does not involve, among other things, systems for recognizing a misdiagnosed a high pressure event in the fuel system.

The systems and methods of the present disclosure may solve one or more of the problems set forth above and/or other problems in the art. The scope of the current disclosure, however, is defined by the attached claims, and not by the ability to solve any specific problem.

SUMMARY

According to one aspect of the present disclosure, a method of controlling a common rail fuel system of an engine system is provided. The common rail fuel system includes a fuel pump, a fuel rail, a plurality of fuel injectors, and a pressure-responsive relief valve fluidly coupled to the fuel rail. The method comprises identifying a pressure condition of the fuel rail indicative of the pressure-responsive relief valve being in an open and latched condition, the identification being based on detecting a rise and reduction in rail pressure within a threshold time period. The method further comprises terminating flow from the fuel pump, while the common rail fuel system is operating, to unlatch and close the pressure-responsive relief valve.

According to another aspect of the present disclosure, a common rail fuel system of an engine system includes a fuel pump, a fuel rail, a plurality of fuel injectors, a pressure-responsive pressure relief valve fluidly coupled to the fuel rail, and a controller. The controller is configured to identify a pressure condition of the fuel rail indicative of the pressure-responsive relief valve being in an open and latched condition, the identification being based on detecting a rise and reduction in rail pressure within a threshold time period. The controller is also configured to terminate flow from the fuel pump, while the common rail fuel system is operating, to unlatch and close the pressure relief valve.

According to yet another aspect of the disclosure, a method of controlling a common rail fuel system of an engine system is provided. The common rail fuel system includes a fuel pump, a fuel rail, a plurality of fuel injectors, and a pressure-responsive relief valve fluidly coupled to the fuel rail. The method comprises identifying a pressure condition of the fuel rail indicative of the pressure-responsive relief valve being in an open and latched condition. The identification being based on detecting a rise and reduction in rail pressure within a threshold time period, and the identification is initiated by detecting a reduction in rail pressure by a threshold amount in a threshold time period.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, “about.” “substantially,” and “approximately” are used to indicate a possible variation of ±10% in the stated value.

Figure 1:
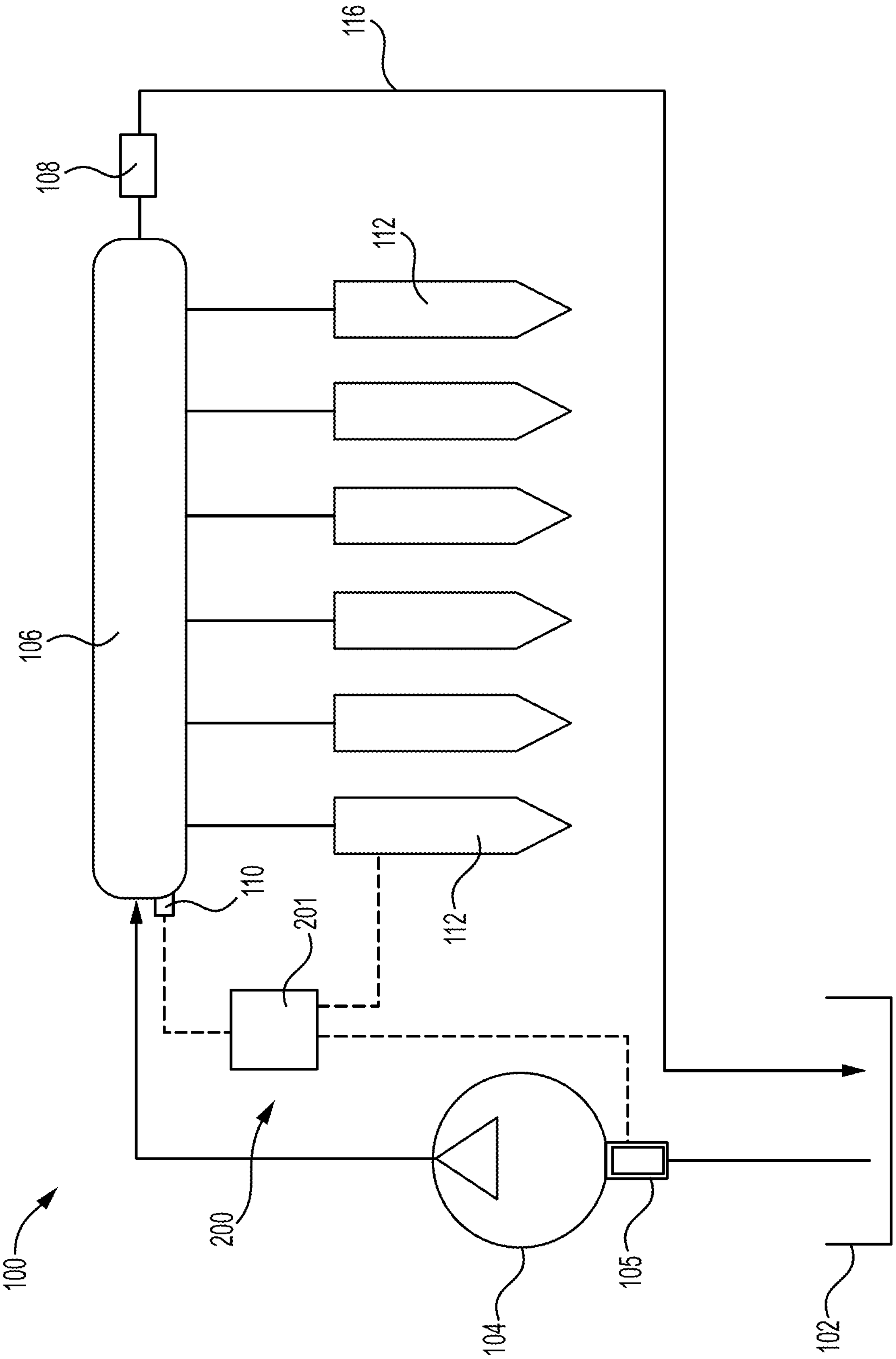
FIG. 1 is a system schematic of a common rail fuel system of an internal combustion engine system, according to aspects of the disclosure.

FIG. 1 illustrates an internal combustion engine system including a common rail fuel system 100. The common rail fuel system 100 may include a fuel tank or sump 102, a fuel pump 104, a common fuel rail 106, a pressure relief (or pressure limiting) valve 108, a rail pressure sensor 110, a plurality of fuel injectors 112, and a fuel rail control system 200 including an electronic controller 201. The common rail fuel system 100 may provide fuel to the internal combustion engine system, which may in turn drive a crankshaft to provide torque to one or more external systems (not shown).

Fuel pump 104 may be any type of fuel pump, such as an inlet-metering fuel pump having a controllable inlet valve 105, for providing fuel at a desired pressure to fuel rail 106. Common fuel rail 106 may be a plenum in the form of a pipe that is directly fluidly coupled to each of the fuel injectors 112 for providing pressurized fuel to the fuel injectors 112. Rail pressure sensor 110 may be of a conventional design for sensing the fuel pressure within common fuel rail 106, and providing the sensed pressure to the electronic controller 201. As will be described in more detail below with respect to FIG. 2, electronic controller 201 may send signals to, and receive signals from, the fuel pump 104, rail pressure sensor 110, and fuel injectors 112, along with other components of the engine system, to control the fuel pressure in fuel rail 106 to a desired pressure based on, e.g. desired power, regulation of engine emissions, etc.

Pressure relief valve 108 may be a pressure-responsive type relief valve directly fluidly connected to the common fuel rail 106 and may include, for example, a mechanical triggering system including, for example, a spring loaded valve and latching element configured for opening, and keeping open (or “latching”), in response to rail pressure in the fuel rail 106 reaching a pressure threshold corresponding to an overpressure condition in the common fuel rail 106. The overpressure condition corresponds to a potentially damaging rail pressure. In the open and latched condition of pressure relief valve 108, fuel in the fuel rail 106 is fluidly connected to a low pressure passageway 116 connecting common fuel rail 106 to fuel tank or sump 102, thereby lowering the pressure in common fuel rail 106. Once opened and latched, pressure relief valve 108 is designed to stay latched open until the pressure in in the common fuel rail 106 is lowered to a valve reset pressure. In one example, pressure relief valve may open and latch at a rail pressure of approximately 270 MPa, and may close (i.e., reset) at a rail pressure of approximately 60 MPa.

Figure 2:
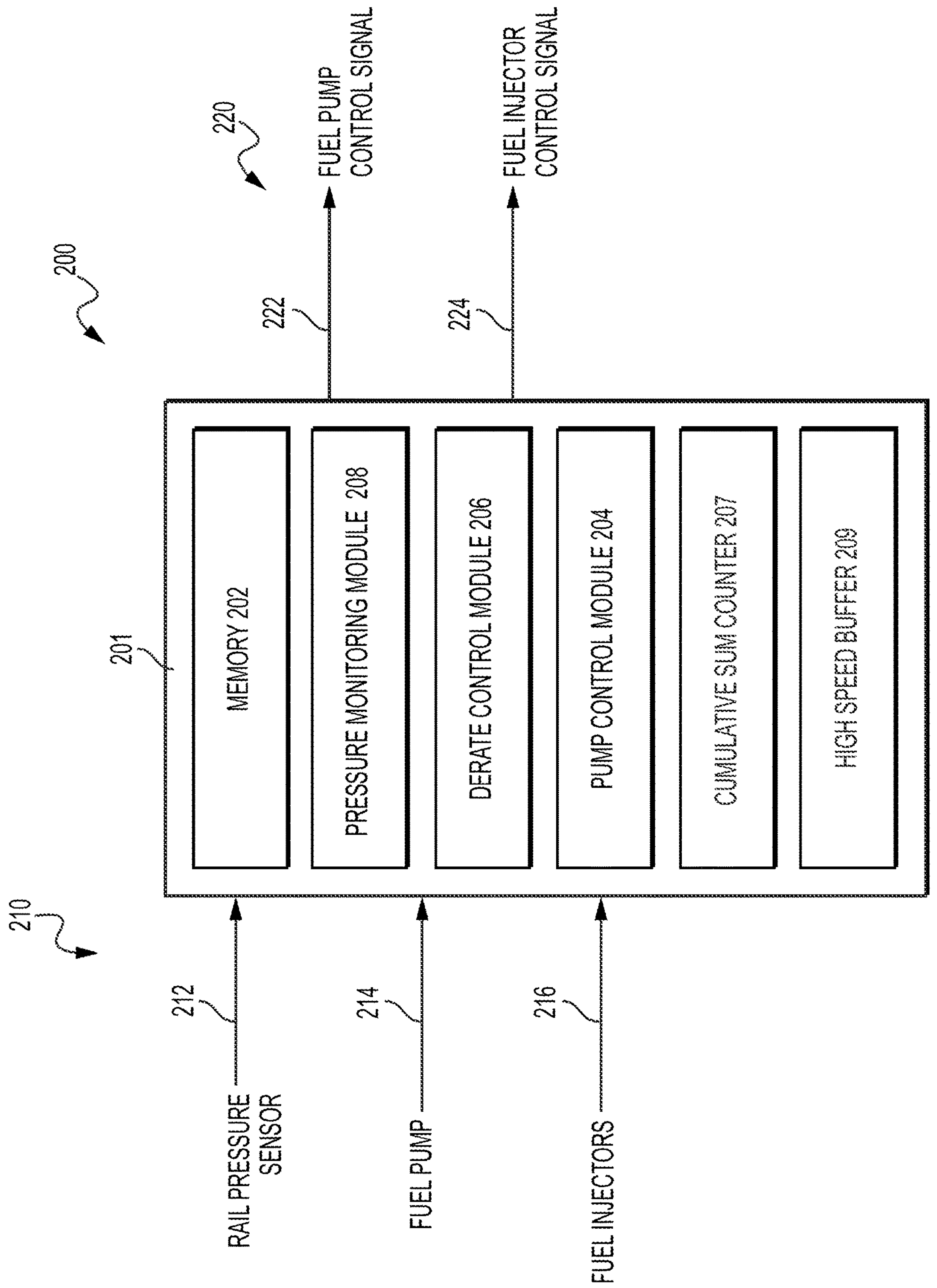
FIG. 2 is a schematic depiction of aspects of a control system of the common rail fuel system of FIG. 1.

Referring now to FIG. 2, the fuel rail control system 200 is depicted in greater detail. The fuel rail control system 200 includes the controller 201, which may be communicatively coupled to or otherwise include one or more modules or systems for carrying out one or more functions of the engine system and common rail fuel system 100. Fuel rail control system 200 may include inputs 210 in the form of data, signals, etc., and outputs 220 in the form of data, signals, etc. For example, the controller 201 may be communicatively coupled to the rail pressure sensor 110 and may receive rail pressure data 212 therefrom. The controller 201 may be communicatively coupled to the fuel pump 104 and may receive fuel pump status data 214 regarding the operational status of the fuel pump 104. The controller 201 may be communicatively coupled to one or more of the plurality of fuel injectors 112 and may receive injector status data 216. The controller 201 may include a memory 202 and various modules, for example, a pump control module 204, a derate control module 206, and a pressure monitoring module 208. In some embodiments, the controller 201 may include a cumulative sum counter 207 that provides a running tally of consecutive values, and a high speed buffer 209 that stores data of the controller 201, both of which will be discussed in more detail. The controller 201 may generate outputs including, among other things, a pump control signal 222 to control one or more functions of the fuel pump 104 and an injector control signal 224 to control one or more functions of the one or more fuel injectors 112.

The controller 201 may include a single processor or multiple processors configured to receive inputs, display outputs, and generate commands to control the operation of components of the engine system, including the common rail fuel system 100. The controller 201 may include or be associated with a memory, a secondary storage device, processor(s), such as central processing unit(s), networking interfaces, or any other means for accomplishing tasks consistent with the present disclosure. The memory or secondary storage device included or associated with controller 201 may store data and software to allow controller 201 to perform its functions, including the functions described below with respect to method 300 (FIG. 3) and the functions of the system 100 described with respect to FIG. 4.

INDUSTRIAL APPLICABILITY

The disclosed aspects of the common rail fuel system 100 of the present disclosure may be used to, for example, control pressures within a fuel rail 106. For example, the disclosed system may determine, by way of the fuel rail control system 200, whether or not a mechanically operated high pressure relieve valve 108 has been opened and latched due to a high pressure condition in the common fuel rail 106, and modifying the operation of the common rail fuel system 100 based on the determination.

Figure 3:
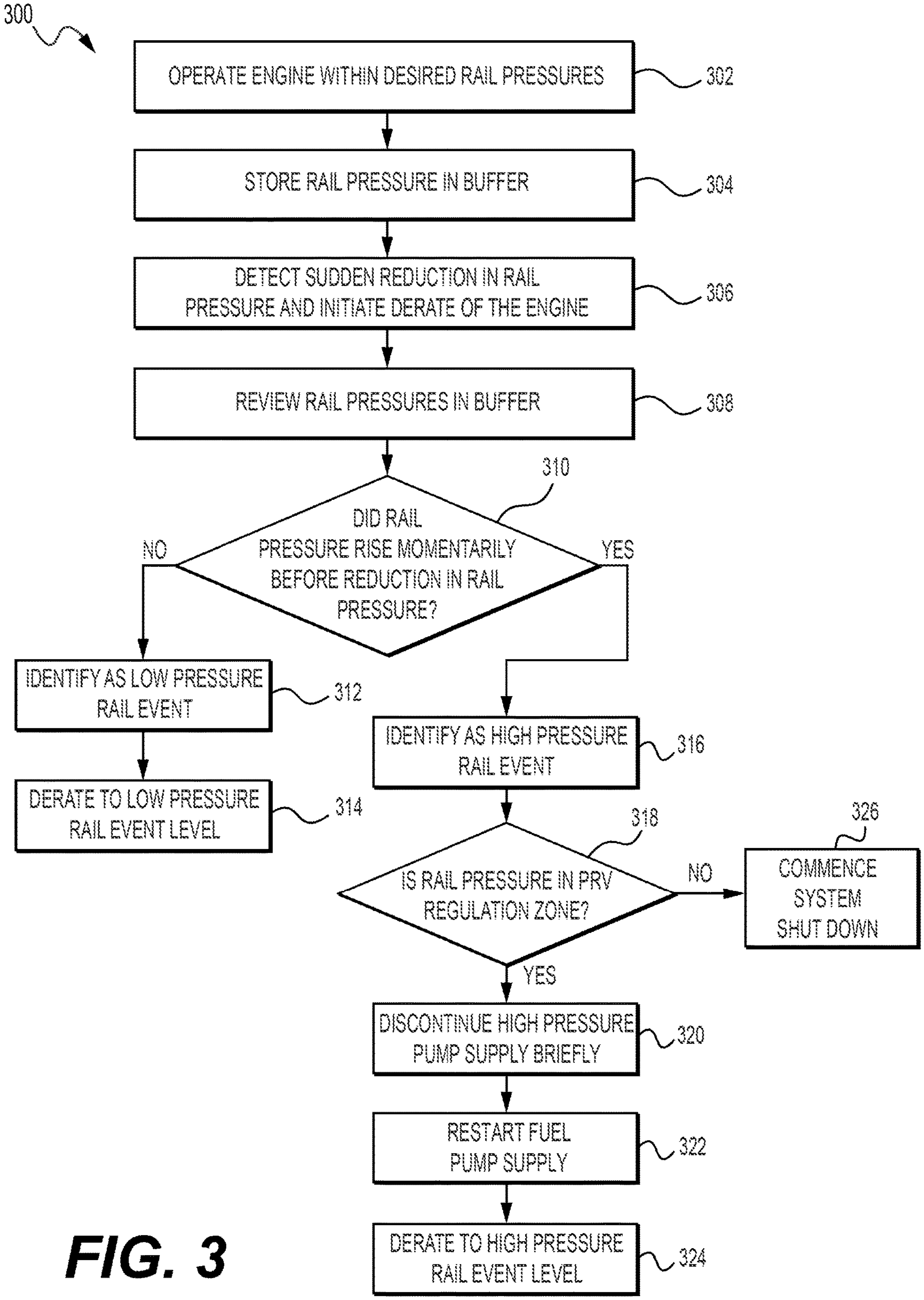
FIG. 3 provides a flowchart depicting an exemplary method for detecting and resetting a pressure relief valve of the common rail fuel system of FIG. 1.

Referring to FIG. 3, a method 300 of operating an internal combustion engine system that includes common rail fuel system 100 is shown. The depicted method begins with operating the engine and common rail fuel system 100 in a normal operating range, e.g. operating the engine with common rail pressures within a desired operating range (step 302). In particular, a normal or desired operating range of the common rail fuel system 100 can include, for example, rail pressures between a lower threshold of 50 MPa and an upper threshold of 230 MPa.

While the engine and common rail fuel system 100 are operating, control system 200 may sense system parameters, such as inputs 210 (FIG. 2). In particular, control system 200 may monitor and store rail pressure data 212 from rail pressure sensor 110 in, for example, the high speed buffer 209 (step 304), as will be explained in more detail below. Control system 200 may also monitor and sense or receive other parameters during operation of the common rail fuel system 100, such as additional inputs 210 including, fuel pump status data 214 and fuel injector status data 216. This additional data may be stored in the memory 202 and/or the other modules of the controller 201 and may be utilized thereby to control one or more functions of the common rail fuel system 100.

Control system 200 may monitor the rail pressure data 212 for an undesired, sudden reduction in rail pressure. For example, control system 200 may be configured to detect when the rail pressure exceeds a rate of change threshold stored in control system 200. Such a rate of change corresponding to an undesired, sudden reduction in rail pressure may be, for example, a rail pressure drop of greater than 100 MPa in less than 1 second. But this level of drop is merely exemplary, and other pressure drops or drop rates could be used as indicating an undesired, sudden reduction in rail pressure, such as a threshold corresponding to a difference between a desired rail pressure and a measured rail pressure for a threshold amount of time. When the control system 200 detects such an undesired, sudden reduction in rail pressure, the control system initiates a derate of the engine (Step 306), and accordingly sends fuel pump and fuel injector control signals 222, 224 based on same.

This detected, undesired, and sudden reduction in rail pressure (Step 306) may be caused by either of two different conditions or events. The first potential cause includes the rail pressure exceeding the pressure threshold of the high pressure relief valve 108, thereby opening and latching the pressure relief valve 108 to relieve the high rail pressures. The opening and latching of the pressure relief valve 108 will open the fuel rail 106 to drain and thus suddenly reduce the pressure in the fuel rail 106. This first cause will be referred to herein as a high pressure event. The second potential cause for the detected, undesired and sudden reduction in rail pressure includes one or more other system faults, including a leak in the fuel rail 106, or a malfunction of the fuel pump 104. This second cause will be referred to herein as a low pressure rail event. The method 300 described herein may be used to help diagnose the cause of the sudden reduction in rail pressure in the common rail fuel system 100—whether the cause is a high pressure rail event or a low pressure rail event. Correctly diagnosing a low pressure rail event (e.g. system leak) versus a high pressure rail event with opened and latched high pressure relief valve 108 may mean the difference between (a) a complete shutdown of the engine system or a highly derated engine operation (in the case of a leak), and (b) continued engine operation at a lower derated engine operation upon the resetting of the open and latched pressured relief valve 108. Accordingly, such diagnostics can increase system operational capacity.

After detecting a sudden reduction in rail pressure and initiating engine derate (Step 306), control system 200 may review the previous rail pressures (prior to the detected sudden reduction in rail pressure) stored in the high speed buffer 209 (step 308) to diagnose the cause of the sudden reduction in rail pressure. In particular, control system 200 may review the previous rail pressures to determine whether the pressure in the rail 106 rose immediately before the detected sudden reduction in rail pressure (Step 310). Such a pressure rise may be identified, for example, by a rail pressure at or above the threshold rail pressure for triggering the pressure relief valve 108—a rail pressure corresponding to an overpressure condition in the common fuel rail 106 (e.g. 270 MPa or greater). It is understood that the identified pressure rise immediately before the detected sudden reduction in rail pressure may alternatively correspond to a positive change in rail pressure immediately before the sudden rail pressure reduction (e.g., 5 MPa, 10 MPa, 20 MPa, etc.). As will be shown in connection with FIG. 4, this pressure rise may, in some instances, last only a short time, such as a fraction of a second, before the pressure relief valve 108 is opened and latched causing the sudden reduction in rail pressure.

Figure 4:
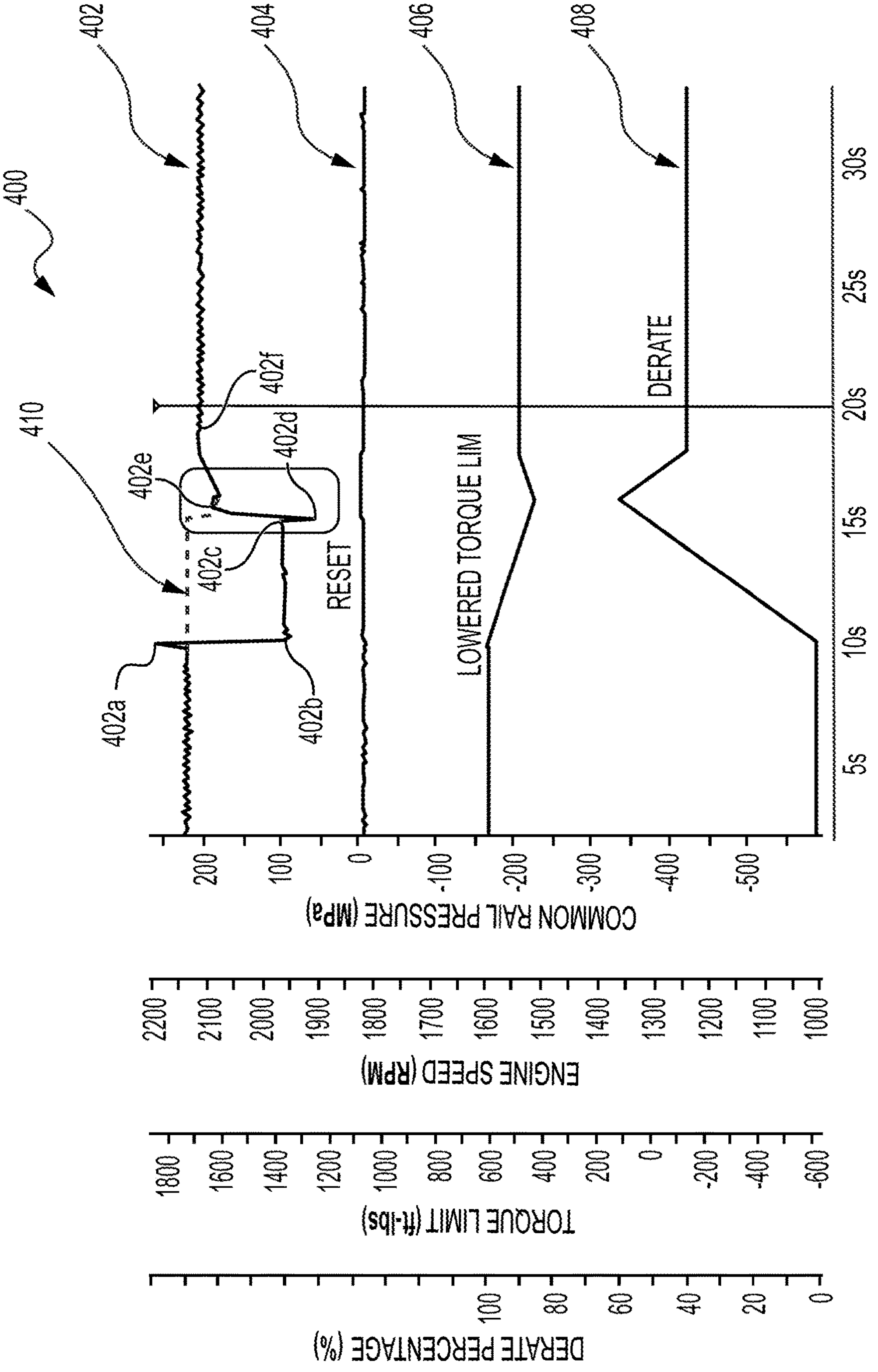
FIG. 4 is a chart depicting operational aspects of the system of FIG. 1.

Thus, the control system 200 identifies a pressure condition of the fuel rail 106 indicative of the pressure relief valve 108 being in an open and latched condition, the identification being based on detecting a rise and reduction in rail pressure within a threshold time period (Steps 306, 310), and the identification is initiated by detecting a reduction in rail pressure by a threshold amount in a threshold time period (Step 306), followed by the detection of a rise in rail pressure based on rail pressure data in a buffer. However, the rise in the rail pressure occurs before the reduction in rail pressure, as depicted in FIG. 4, discussed below.

If the review of the previous rail pressures (Step 306) by control system 200 determines that the rail pressures did not rise immediately before the detected sudden reduction in rail pressure (Step 310—No), the control system 200 will diagnose the system as having a low pressure rail event (Step 312), caused, for example, by a system leak, fuel pump malfunction, or other malfunction. In response to this determination, control system 200 will continue the initiated engine derate (Step 306) to a derate level corresponding to the determination of a low pressure rail event (Step 314). For example, the derate level may include a complete engine shutdown or a derate or limp-home operation sufficient to prevent damage to system components during operation of the system in a compromised condition. Such a limp-home derate may be, for example, greater than 50% derate, such as 60% derate.

However, if at step 310 the review of the rail pressures in the high speed buffer 209 indicates that rail pressure did rise above the open and latch pressure of the pressure relief valve 108 before a reduction in rail pressure (Step 310—Yes), the system will identify the reduction in rail pressure as a high pressure event at step 316, corresponding to a high pressure fault condition. This fault condition will need to be further analyzed, as provided in steps 318-324 to determine how to further control the common rail fuel system 100.

After determining that the reduction in rail pressure is based on a high pressure event (Step 316), the system monitors rail pressures to determine whether or not rail pressures are being maintained within a pressure relief valve regulation zone ("PRV regulation zone") at step 318. The PRV regulation zone corresponds to a range of rail pressures with a lower limit that is greater than the reset pressure of the pressure relief valve 108 (e.g., 60 MPa), and an upper limit that is less than the open and latch pressure of the pressure relief valve 108 (e.g., 270 MPa). For example, the common rail fuel system 100 may be attempting to correct for a lower than desired rail pressure (based on an unrecognized opening and latching of the pressure relief valve 108). In such instances, rail pressure may be approximately 90 MPa, greater than the pressure relief valve reset pressure of approximately 60 MPa, and less than the opening and latching pressure of approximately 270 MPa. The controller 201, via pressure monitoring module 208, may review rail pressures for a time period (e.g., 1 second, 5 seconds, 10 seconds, etc.) to determine whether the rail pressures are being maintained within the PRV regulation zone. Maintaining the fuel rail 106 with pressures in the PRV regulation zone indicates that the system is attempting to maintain desired rail pressures, but has not recognized that the pressure relief valve 108 is open and latched.

When a high pressure rail event has been identified (Step 316), and the rail pressures are not within the PRV regulation zone. (Step 318—No), the operation of the common rail fuel system 100 is considered faulty to the extent that engine shutdown or other engine reduction or derate is necessary (Step 326). An inability of the common rail fuel system 100 to maintain pressures within the PRV regulation zone may indicate a system fault that is not diagnosable using only the system described herein. For example, a constant fuel rail pressure below the PRV regulation zone could indicate a leak in a fuel rail supply line, a failure of the high pressure fuel pump, or other system fault. A constant fuel rail pressure above the PRV regulation zone could indicate a failed pressure sensor or other system fault.

If common rail fuel system 100 is operating in the PRV regulation zone (Step 314—Yes), the system may discontinue or terminate flow from fuel pump 104 briefly (e.g., less than one second, or ~100 msec) at step 320. Such discontinuation of the fuel pump 104 may be achieved, for example, by terminating pumping/outputting fuel from the fuel pump 104, for example, by sending commands 222 to the fuel pump 104 to stop or limit flow of fuel into the pump via inlet metering valve 105, or by terminating power to the pump 104. This reduction in output from the fuel pump 104 takes place while the common rail fuel system is otherwise operating, and may lower the pressure within the fuel rail 106 below a reset pressure of the pressure relief valve 108 (approximately 60 MPa), allowing the pressure relief valve 108 to close and allow the common rail fuel system 100 to regain integrity and operate at desired rail pressures. Terminating pump flow may be controlled by, for instance, the pump control module 204, which may receive fuel pump status data 214 from the fuel pump 104 (e.g., is the fuel pump in an on/off state, etc.) or a status of a fuel pump inlet metering valve 105 (e.g., is the fuel pump inlet metering valve open/shut, etc.). Once flow from the fuel pump 104 is terminated, the common rail fuel system 100 may continue to operate, injecting fuel from the common rail 106 to the cylinders (not shown) through the fuel injectors 112. With the flow from the fuel pump 104 terminated and the fuel injectors 112 providing fuel to the cylinders (not depicted) the pressure in the common rail may decrease rapidly, allowing unlatching and closing high pressure relief valve 108. Upon a closing or resetting of the relief valve 108, fuel no longer flows from the common rail 106 through the relief valve 108 to the sump 102. With the pressure relief valve 108 in the closed condition, fuel flow from the fuel pump may be restarted at Step 322 (e.g., the fuel pump 104 may be powered back on, or the pump inlet metering valve 105 may be reopened, etc.)

After the high pressure relief valve 108 has been closed/reset, the engine and common rail fuel system 100 may continue at a partial derated level, for example, a derate level corresponding to the determination of a high pressure rail event level (Step 324). The high pressure rail event level derate level may be a level of system operation at a partially derated level, which may allow for system operation at a level sufficient for some engine operations but may permit further system diagnosis or may prevent subsequent or further damage to the engine. In some embodiments, the partial derate condition associated with a high pressure rail event may be a higher operating condition than a full derate condition, such as a derate level triggered by an identification of a low pressure rail event. However, even if discontinuing pump supply successfully closes the pressure relief valve 108 and returns the rail pressures to at or near a desired level, the system may continue to operate in a partial derate condition until a complete diagnosis or system condition can be determined. For example, the high pressure rail event derate may operate the engine at a 40% derate, which may correspond to approximately 80% of engine capacity, until diagnostics can be performed. As noted above, this derated engine operating condition is higher than an engine derate associated with the identification of a low pressure rail event (Step 312), which can be, for example a 60% derate, or greater derate. The lower derate associated with a high pressure rail event may allow for greater operational versatility than that of a low pressure rail event. Further, in one aspect, continued operation of the machine at the lower derate associated with the high pressure rail event may be variable, and the derate may decrease if no further sudden reductions in rail pressure are detected.

Referring to FIG. 4, one example of operation of the common rail fuel system 100 is shown in a chart 400. The chart 400 includes multiple graphs along the x-axis, which axis indicates a progression of time (in seconds) as a high pressure fault, opening and latching, and closing or resetting of the high pressure relief valve 108 occurs. Stacked on the y-axis of FIG. 4 are actual or measured rail pressure values 402 and desired rail pressure values 410 of the common rail 106, an engine speed 404, a torque limit 406 of the engine system, and a derate percentage condition 408 of the engine system.

As time progresses along the x-axis, the engine system 100 operates in a steady state condition with the common rail pressure, as measured by the rail pressure sensor 110, in a steady state condition until just after 10 seconds, when a high pressure condition (at point 402*a*) trips the high pressure relief valve 108 and the relief valve 108 opens and stays latched open. Upon opening and latching of the high pressure relief valve 108, the fuel pressure immediately drops to a steady state condition at a lower pressure (at point 402*b*). At this steady state lower pressure condition, the volume of fuel that escapes the fuel rail through the pressure relief valve 108 is compensated for by the volume of fuel provided to the fuel rail 108 from the fuel pump 104. As noted above, this steady state rail pressure 402*b* may be approximately 90 MPa and within the PRV regulation zone-greater than the pressure relief valve reset pressure of approximately 60 MPa, and less than the opening and latching pressure of approximately 270 MPa.

At point 402*c*, the pressure in the fuel rail has been monitored for long enough to be considered at steady state, and the rail pressures have been determined to be within the PRV regulation zone for long enough using the cumulative sum counter, such that the low rail pressure condition can be determined to be a high pressure rail event requiring a discontinuing of the supply of fuel from the fuel pump 104. At point 402*c*, flow from the fuel pump 104 is discontinued briefly (e.g., less than 1 second), as indicated in the drop in actual fuel pressure 402 at approximately 15 seconds on the chart.

Once flow from the fuel pump 104 is discontinued to the common rail 106 with the engine system continuing to operate, the pressure in the common fuel rail drops rapidly as a result of the fuel from the fuel injectors 112 continuing to flow to the engine cylinders (not depicted). It may only take, for example, one or two cycles of the engine system 100 for the fuel to drop below a reset pressure to close the pressure relief valve 108. Flow from the fuel pump 104 through the fuel injectors 112 to the cylinders can then be resumed (point 402*d*).

Once the rail pressure has dropped below the pressure relief valve 108 reset or closing pressure and the pressure relief valve unlatches to close, flow from the pump can be resumed. As shown in FIG. 4, once pump flow is restarted, the pressure in the common rail 106 rises rapidly. The rise in pressure to the desired pressure (at point 402*e*) indicates a successful reset of the high pressure relief valve, and indicates that common rail system integrity, at least with respect to the relief valve 108 is intact. The desired rail pressure after a determination of low pressure in the fuel rail that is determined to have been the result of a high pressure condition may be a lower desired pressure than the desired pressure before the determination of the low pressure condition. This is because the system may operate in a derated condition as described above. The actual pressure in the common rail 106 eventually settles out to the desired pressure (e.g., a derate pressure), and a steady state condition (at point 402*f*).

Referring to the graphs of the torque limit 406 and the derate condition 408, operation of the system 100 in a derated condition subsequent to the pressure transients is described. Operation in a derated condition may refer to steps the system 100 may take to limit an engine output upon detection of the detected sudden reduction in rail pressure at point 402*b* in order to avoid operation of a system which may have one or more undiagnosed system faults (e.g., a slow, difficult-to-detect leak which could be exacerbated by operation of the system in a fully rated condition, fully rated condition being normal operation of the machine up to and at its full, normal operating capability, etc.) More specifically, once the initial low pressure condition is detected at point 402*b*, the derate control module 208 may begin to derate the engine, and may continue to derate the engine to a high derated condition (e.g., a 60% derate corresponding to a low pressure rail event). Simultaneously, the engine system's torque limit 406 is reduced. Derating the engine system helps to regulate pressure in the fuel rail 106, which at least at point 402*b*, could be considered to have a fuel leak or other fault in the system. However, in the depicted embodiment, the pressure relief valve 108 is reset at point 402*d*, which allows pressure in the common rail to return to the desired rail pressure, albeit at the derated level of desired rail pressure. Upon closing of the pressure relief valve 108 and return of the rail pressures to desired rail pressures at the derated level, the engine system 100 may be operated at lower derate (e.g. a 40% derate as a result of the high pressure rail event) as indicated by the flat portions of the graphs of the torque limit 406 and the derate condition 408 after point 402*d*, respectively. This reduced operating capacity may be desirable so that the engine system 100 does not operate at full capacity when there may be a condition which reduces pressure in the common rail (e.g., in the case where there are two simultaneous faults in the system one creating the high pressure condition that trips the high pressure relief valve and one involving, for example, a slow fuel leak).

The present disclosure provides a system for identifying or diagnosing operation of a common rail fuel system 100 that has an open and latched pressure relief valve 108, and tailoring engine derate based on the same. Further, the present disclosure avoids extended operation of a pressure relief valve 108 in an open and latched condition that can damage the valve. Even further, the disclosed system avoids full engine system shutdowns to reset the is pressure relief valve 108.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method of controlling a common rail fuel system of an engine system, the common rail fuel system having a fuel pump, a fuel rail, a plurality of fuel injectors, and a pressure-responsive relief valve fluidly coupled to the fuel rail, the method comprising:

identifying a pressure condition of the fuel rail indicative of the pressure-responsive relief valve being in an open and latched condition, the identification being based on detecting a rise and subsequent reduction in rail pressure, wherein identifying the pressure condition includes:

detecting the reduction in the rail pressure of the common fuel rail system; and determining whether the reduction in the rail pressure was caused by a high pressure rail event or a low pressure rail event; and in response to determining that the reduction in the rail pressure was caused by a high pressure rail event, terminating flow from the fuel pump, while the common rail fuel system is operating, to unlatch and close the pressure-responsive relief valve.

2. The method of claim 1, wherein detecting the reduction in the rail pressure further comprises detecting that the rail pressure was reduced by a threshold amount in a threshold time period.

3. The method of claim 1, further including detecting that the rail pressure is between a valve opening and valve resetting pressure of the pressure-responsive relief valve, prior to terminating flow from the fuel pump.

4. The method of claim 3, wherein the valve opening pressure is approximately 270 MPa and the valve resetting pressure is approximately 60 MPa.

5. The method of claim 3, further including restarting fuel supply from the fuel pump after terminating flow for less than one second.

6. The method of claim 1 further including derating the engine system in response to determining that the reduction in the rail pressure was caused by a high pressure rail event.

7. The method of claim 6, further including injecting fuel with the plurality of fuel injectors while fuel flow from the fuel pump is terminated.

8. The method of claim 1, wherein determining that the reduction in the rail pressure was caused by a high pressure rail event comprises detecting a rise in the rail pressure prior to the reduction in the rail pressure.

9. The method of claim 8, further comprising detecting the rise in the rail pressure using rail pressure data stored in a data buffer.

10. A common rail fuel system of an engine system, comprising:

a fuel pump, a fuel rail, a plurality of fuel injectors, a pressure-responsive pressure relief valve fluidly coupled to the fuel rail, and a controller configured to:

identify a pressure condition of the fuel rail indicative of the pressure-responsive relief valve being in an open and latched condition, the identification being based on detecting a rise and reduction in rail pressure, wherein identifying the pressure condition includes:

detecting the reduction in the rail pressure of the fuel rail; and determining whether the reduction in the rail pressure was caused by a high pressure rail event or a low pressure rail event;

in response to determining that the reduction in the rail pressure was caused by a high pressure rail event, terminate flow from the fuel pump and derate the engine system to a first derate level while the engine system continues to operate; and in response to determining that the reduction in the rail pressure was caused by a low pressure rail event, derate the engine system to a second derate level that is greater than the first derate level and limits an output of the engine system more than the first derate level while the engine system continues to operate.

11. The common rail fuel system of claim 10, wherein detecting the reduction in the rail pressure comprises detecting that the rail pressure was reduced by a threshold amount in a threshold time period.

12. The common rail fuel system of claim 10, wherein the controller is further configured to detect that the rail pressure is between a valve opening pressure and a valve resetting pressure of the pressure-responsive relief valve, prior to terminating flow from the fuel pump.

13. The common rail fuel system of claim 12, wherein the valve opening pressure is approximately 270 MPa and the valve resetting pressure is approximately 60 MPa.

14. The common rail fuel system of claim 12, wherein the controller is further configured to restart fuel flow from the fuel pump after terminating flow for less than one second.

15. The common rail fuel system of claim 14, wherein the controller is further configured to determine that the reduction in the rail pressure was caused by a high pressure rail event by determining that the pressure-responsive relief valve is in an open and latched condition.

16. The common rail fuel system of claim 15, wherein the controller is further configured to inject fuel from the plurality of fuel injectors while fuel flow from the fuel pump is terminated.

17. The common rail fuel system of claim 10, wherein the controller is further configured to determine that the reduction in the rail pressure was caused by a high pressure rail event by detecting a rise in the rail pressure prior to the reduction in the rail pressure.

18. The common rail fuel system of claim 17, wherein the controller is further configured to detect the rise in the rail pressure using rail pressure data stored in a data buffer.

19. A method of controlling a common rail fuel system of an engine system, the common rail fuel system having a fuel pump, a fuel rail, a plurality of fuel injectors, and a pressure-responsive relief valve fluidly coupled to the fuel rail, the method comprising:

identifying a pressure condition of the fuel rail indicative of the pressure-responsive relief valve being in an open and latched condition, the identification being based on detecting a rise and subsequent reduction in rail pressure, wherein identifying the pressure condition includes:

detecting the reduction in the rail pressure of the fuel rail; and determining whether the reduction in the rail pressure was caused by a high pressure rail event or a low pressure rail event;

determining whether the rail pressure is maintained within a range of pressure values after the reduction in rail pressure; and in response to determining that the rail pressure is maintained within the range of pressure values, terminating flow from the fuel pump.

20. The method of claim 19, wherein determining that the reduction in the rail pressure was caused by a high pressure rail event comprises detecting a rise in the rail pressure prior to the reduction in the rail pressure.

* * * * *